March 13, 1956     F. H. SCHULZ     2,738,084
BUCKET ATTACHMENT FOR TRACTORS
Filed April 12, 1954
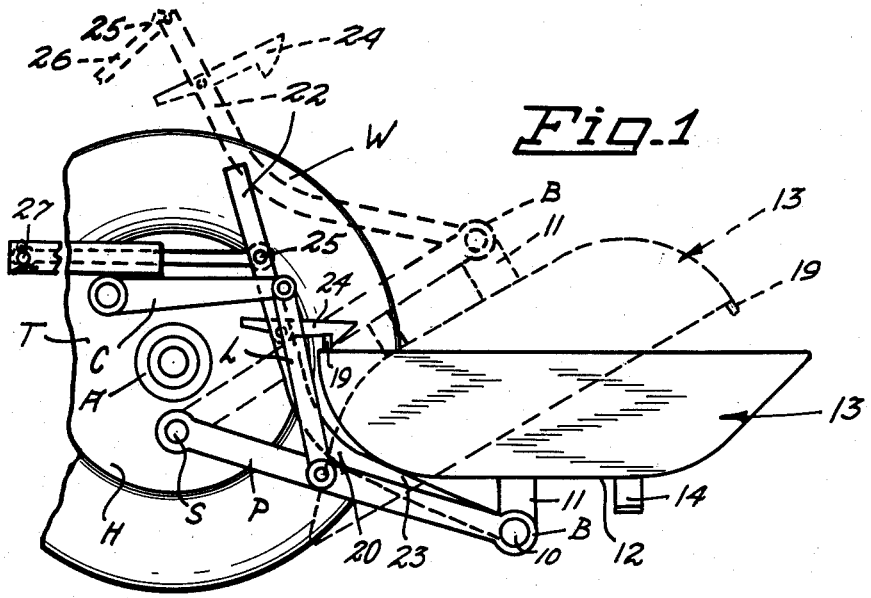
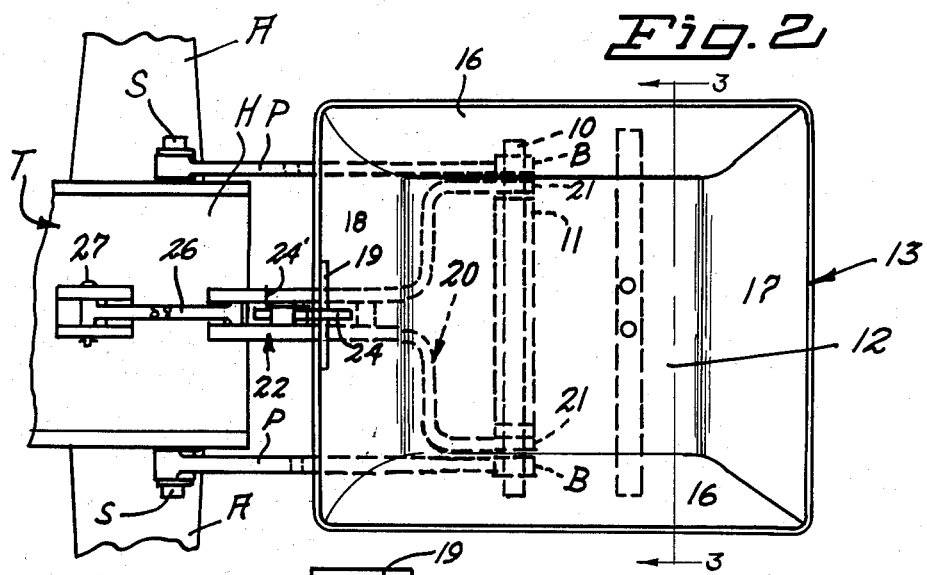
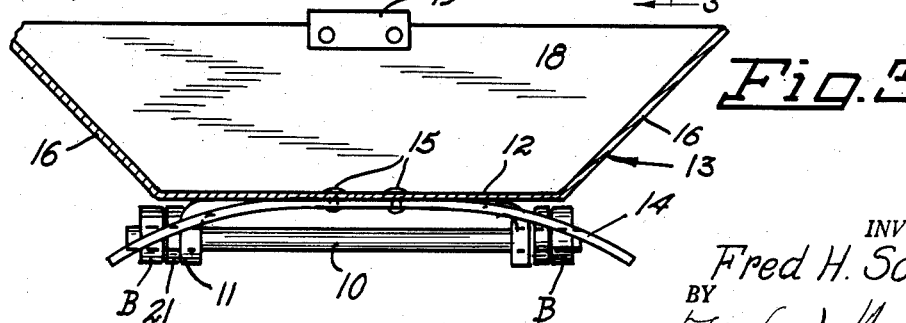
INVENTOR.
Fred H. Schulz
BY

United States Patent Office 2,738,084
Patented Mar. 13, 1956

2,738,084

BUCKET ATTACHMENT FOR TRACTORS

Fred H. Schulz, Spokane, Wash.

Application April 12, 1954, Serial No. 422,502

2 Claims. (Cl. 214—140)

This invention relates to mobile support vehicles and more particularly to a bucket attachment for a tractor.

One object of the invention lies in the provision of a bucket attachment supported to be raised and lowered by means of the vertically movable powered arms of a tractor and adapted to be swiveled for movement from a normal upright position to an inverted position for dumping.

Another object of the invention lies in the provision of the combination of a tractor having powered support arms and a dumping bucket mounted thereon for swivel movement to an inverted position.

These and other objects of the invention become apparent during the course of the following description and drawings wherein a preferred form of the invention is disclosed. It should be understood, however, that the disclosure is descriptive only and is not intended to limit the scope of the invention except insofar as it is limited in the appended claims.

In the drawings:

Figure 1 is a side elevation of the improved attachment for a tractor showing the bucket supported on the powered arms at the rear end of a tractor having the near rear wheel removed for convenience of illustration;

Figure 2 is a plan view of the bucket and fragmentary portion of the rear end of the tractor; and Figure 3 is a transverse cross section as at line 3—3 of Figure 2.

Referring now more particularly to the drawings, I have shown a tractor T of the wheeled type having the customary transversely extending axle housings A extending from both sides of the transmission housing H and conventionally journaling rear drive wheels W on the free ends thereof. In this disclosure of the invention, the rear transmission housing is provided with coaxial journal shafts S, one on each side, to which powered support arms P are secured for vertical tilting movement. The power to raise and lower the arms P is derived from a tractor powered crank arm C which is united with the power arms P by means of a link L. This is conventional construction in at least one present day tractor, however, other constructions may be employed if desired wherein vertically movable powered arms are provided.

At their free ends, the powered arms P are provided with bearings B adapted to receive a horizontally disposed transversely extending shaft 10 and journal the shaft for axial rotation therein.

The shaft 10 carries a bracket 11 secured to the bottom 12 of the bucket 13 and disposed inwardly of the weight center or toward the forward end of the tractor. It is thus seen that the bucket is mounted for swivel movement about the horizontal axis defined by the axis of the shaft 10 which permits the bucket to be inverted and disposed below the shaft 10.

Outwardly spaced from the shaft 10 I provide a transversely extending downwardly arcuate resilient strap 14 secured as by rivets 15 to the bottom 12 of the bucket and which is of such length that it is adapted to contact the arms P when the bucket 13 is inverted and thus limit the swivel movement of the bucket and cushion its dumping movement by decelerating the swivel movement at the end thereof.

The bucket is provided with upwardly diverging side walls 16 and outer and inner diverging end walls 17 and 18. Midway its width at the top edge, end wall 18 is provided with a latch keeper plate 19 to strengthen the inner end wall 18 for the purpose of cooperating with a latch 24 for securing the bucket in normal upright position.

To maintain the bucket 13 in substantially a horizontal position during the lifting movement I provide a yoke 20 which has its outer ends 21 journaled on the shaft 10 adjacent to the bearings B and outside of the bracket 11. Its inner end portions 22 which are disposed in near spaced relation, extend upwardly at an obtuse angle with relation to the lower end portions 23. A latch 24 having a spring 24' urging it into latching engagement is carried by the inner end portions 22 and is adapted to cooperate with the latch plate 19 to secure the bucket 13 in relative position to the yoke 20. At a point spaced above the latch 24 the upper end portion 22 of the yoke 20 is provided with a transversely extending journal pin 25 which pivotally unites a hinge link 26 having its opposed end pivotally united at 27, to a fixed point on the tractor T. To install or remove the bucket attachment it is only necessary to manipulate the pin 27 and the shaft 10 which requires only a few minutes time. The length of the hinge link 26 is substantially the same as that of arms P thus forming a substantial parallelogram and causing the bucket 13 to be raised in the same plane of its normal upright position when the latch is engaged with the latch plate. However, the hinge link 26 may be of greater or lesser length than the arms P and will cause the bucket 13 to tilt to some extent if desired.

The attachment has been found to have many uses about the farm where loose or bulk material as well as that in containers may be loaded and transported from place to place and dumped conveniently by operation of the latch 24. The bucket has also been employed to transport mixed cement to be dumped at a predetermined location.

One important feature of the present invention is the fact that the bucket will invert to a completely upside down position wherein all of its contents are expelled without necessitating manual labor to do so and the weight center of the bucket is offset from the support to such a degree that limited effort is required to return the empty bucket to its normal position.

Having thus described my invention, I claim:

1. The combination with a tractor having powered support arms having vertically movable free ends; of a bucket carried by coaxial journals supported by the free ends of said arms for swivel movement to an inverted position, said journals being disposed inwardly of the weight center of said bucket; latch means releasably securing the bucket in normal position, whereby disengagement of said latch effects swivel movement of said bucket to the inverted position; and a transversely disposed resilient bar secured to said bucket outwardly of said swivel axis and arranged to strike the support arms when the bucket is inverted and constituting a buffer.

2. An attachment for tractors having a pair of powered vertically tiltable arms, comprising a bucket supported on said arms to be raised and lowered thereby; said bucket being journaled on the ends of said arms for swivel movement in a vertical plane and having its weight center disposed outwardly of its swivel axis;

a yoke carried at its outer end at the swivel axis of said bucket and at its inner end by a vertically tiltable hinge link pivoted to said tractor, for maintaining the normal position of the bucket during powered movement of said arms; a latch carried by said yoke and securing said bucket against accidental swivel movement relative to said yoke and releasable to effect said swivel movement, wherein the bucket is inverted; and a transversely disposed arcuate resilient bar secured to the bottom of said bucket outwardly of said swivel axis and arranged to strike the support arms when the bucket is inverted and constituting a buffer.

References Cited in the file of this patent

UNITED STATES PATENTS

| | | |
|---|---|---|
| 2,426,544 | Wooldridge | Aug. 26, 1947 |
| 2,517,163 | Arps | Aug. 1, 1950 |